Patented Nov. 16, 1948

2,453,873

UNITED STATES PATENT OFFICE 2,453,873

TUBOCURARE PURIFICATION

Frank A. Steldt, Indianapolis, Ind., assignor to Eli Lilly and Company, Indianapolis, Ind., a corporation of Indiana No Drawing. Application May 29, 1947, Serial No. 751,457

6 Claims. (Cl. 260—236)

This invention relates to curare and more particularly to the purification of the lissive-active alkaloid in tubocurare.

As generally available in commerce, tubocurare is a thick brown or black syrup which comprises chiefly gummy material of indefinite composition and water, and which contains, in amounts varying up to about 20 percent, d-tubocurarine, an alkaloid which possesses the desired lissive or paralytic effect on the animal organism. Inasmuch as curare preparations are not effective when administered orally but require parenteral administration for realization of therapeutic benefits, and further, because even the purest and crystalline form of d-tubocurarine possesses a low therapeutic index, it is obvious that a crude curare of varying composition is unsuitable for therapeutic use.

The purest and crystalline form of lissive-active alkaloid of curare is very difficult to obtain and its preparation requires a long and complicated procedure which is both costly and inefficient. It is therefore an object of my invention to provide a simple and expeditious process of preparing the lissive-active alkaloid of tubocurare in purified form suitable for therapeutic use.

In accordance with my invention, uniform, purified curare preparations of high potency are prepared by subjecting the crude tubocurare of commerce to aqueous-alcohol fractionation, adsorbing the lissive-active alkaloid and impurities on alumina, and preferentially desorbing the alkaloid.

The practice of my invention may be carried out in accordance with the following general description.

Crude tubocurare is dissolved in about an equal weight of water and the solution is treated with several volumes of a monohydric, water-miscible alcohol whereby the inactive and dark-colored gummy materials present in the tubocurare are largely precipitated, but the desired active curare alkaloid is retained in solution. To obtain in solution any active alkaloid occluded in the precipitate, the precipitated material is separated, redissolved in water and reprecipitated with alcohol in accordance with the above procedure. The solution and precipitation procedure desirably is repeated a third time. The aqueous alcoholic filtrates are combined and the water is removed to obtain a substantially anhydrous alcoholic solution. The water may be removed from the alcohol by treatment with a suitable dehydrating agent, or more conveniently, by evaporation of the aqueous alcohol to dryness and solution of the resultant residue in substantially anhydrous alcohol. The anhydrous alcoholic solution is passed through a column of alumina which adsorbs both the active alkaloid and most of the impurities. The alumina is then eluted with substantially anhydrous alcohol causing a desorption of the alkaloid, but leaving adsorbed substantially all of the impurities. The alcoholic eluate is then evaporated to dryness yielding a residue which comprises the active alkaloid in relatively pure form.

A specific example of the practice of my invention is as follows:

100 grams of crude commercial curare are dissolved in 100 cc. of distilled water, with gentle warming. To the solution are added with stirring 800 cc. of ethanol whereupon a heavy dark brown precipitate results. The mixture is allowed to stand several hours to permit flocculation of the precipitate, and is then filtered. The precipitate is redissolved in 100 cc. of water, is treated with 800 cc. of ethanol, and allowed to stand as before. The flocculated precipitate is filtered off and the process of solution of the precipitate in water and precipitation with ethanol is repeated for a third time. The alcoholic filtrates are combined and evaporated to dryness yielding a reddish brown solid. The solid is dissolved in 500 cc. of absolute ethanol and the solution is passed through a column of activated alumina, about 5.5 cm. in diameter and 20 cm. in length. The alumina is then treated with about 3 liters of absolute ethanol thereby desorbing the alkaloid but leaving adsorbed substantially all the impurities. Evaporation of the ethanol to dryness, preferably in vacuo, yields a light tan colored solid which contains practically all of the lissive-active alkaloid which was present in the crude curare and which possesses a high degree of physiological potency.

The active alkaloid thus prepared weighed about 20 grams and possessed a potency of about 5 times that of the original crude curare, the potency being about 83 percent of that of pure, crystalline d-tubocurarine. The observed optical rotation of the alkaloid was $[\alpha]_D^{25} = +185°$ as compared with the experimentally determined values of $[\alpha]_D^{25} = +198\text{–}225°$ which have been observed with pure d-tubocurarine.

Alcohols suitable for the purposes of this invention comprise the water-miscible monohydric alcohols, namely methanol, ethanol, n-propanol and isopropanol. Ethanol is preferred because of its ready availability.

The alumina which is used as the adsorbent may be any of the commonly used activated aluminas known to the art to be suitable for chromatographic purposes. The dimensions of the alumina column on which the adsorption is effected preferably comprise a length-width ratio of about 3 to about 5, since such a ratio permits a ready adsorption and good separation of undesirable components but does not require excessive amounts of solvent for elution of the active alkaloid. The amount of alumina used preferably is somewhat in excess of the amount estimated as sufficient to adsorb substantially all of the impurities. An excess of alumina tends to prevent desorption of impurities but yet permits the active alkaloid to be desorbed by continued elution with alcohol.

I claim:

1. The process of preparing in purified form the lissive-active alkaloid of tubocurare, which comprises precipitating gummy impurities from a water solution of crude tubocurare with a monohydric, water-miscible alcohol, preparing a substantially anhydrous solution of the soluble portion of the tubocurare in a monohydric water-miscible alcohol, adsorbing the lissive-active alkaloid and concomitant impurities on activated alumina, selectively desorbing the alkaloid with a substantially anhydrous, monohydric, water-miscible alcohol, and recovering the alkaloid by evaporating the alcohol.

2. In the process of purifying the lissive-active alkaloid of tubocurare, the steps which comprise adsorbing the active alkaloid and concomitant impurities on activated alumina from a substantially anhydrous monohydric water-miscible alcohol, and desorbing therefrom the active alkaloid with a substantially anhydrous, monohydric, water-miscible alcohol.

3. In the process of purifying the lissive-active alkaloid of tubocurare, the step which comprises desorbing the alkaloid from activated alumina with a substantially anhydrous monohydric, water-miscible alcohol.

4. The process of preparing in purified form the lissive-active alkaloid of tubocurare which comprises precipitating gummy impurities from a water solution of crude tubocurare with ethanol, preparing a substantially anhydrous solution of the soluble portion of the tubocurare in ethanol, adsorbing the active alkaloid and concomitant impurities on activated alumina, selectively desorbing the alkaloid with substantially anhydrous ethanol, and recovering the alkaloid by evaporating the ethanol.

5. In the process of purifying the lissive-active alkaloid of tubocurare, the steps which comprise adsorbing the alkaloid and concomitant impurities on activated alumina from a substantially anhydrous ethanol solution, and desorbing therefrom the alkaloid with substantially anhydrous ethanol.

6. In the process of purifying the lissive-active alkaloid of tubocurare, the step which comprises desorbing the alkaloid from activated alumina with substantially anhydrous ethanol.

FRANK A. STELDT.

No references cited.